United States Patent
Suzuki et al.

(10) Patent No.: US 9,449,158 B2
(45) Date of Patent: Sep. 20, 2016

(54) EXPIRATION TIME AUTHENTICATION SYSTEM, EXPIRATION TIME AUTHENTICATION DEVICE, AND EXPIRATION TIME AUTHENTICATION METHOD FOR APPLICATIONS

(71) Applicant: Alpine Electronics, Inc., Tokyo (JP)

(72) Inventors: Mitsuru Suzuki, Iwaki (JP); Akihisa Baba, Iwaki (JP); Kumiko Kohata, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 14/656,275

(22) Filed: Mar. 12, 2015

(65) Prior Publication Data

US 2015/0302186 A1    Oct. 22, 2015

(30) Foreign Application Priority Data

Apr. 21, 2014 (JP) .................... 2014-087326

(51) Int. Cl.
*G06F 21/00* (2013.01)
*G06F 21/31* (2013.01)

(52) U.S. Cl.
CPC ....... *G06F 21/31* (2013.01); *G06F 2221/2137* (2013.01)

(58) Field of Classification Search
None
See application file for complete search history.

(56) References Cited

U.S. PATENT DOCUMENTS

| 5,764,892 A * | 6/1998 | Cain | G06F 21/313 340/5.5 |
| 7,483,988 B2 * | 1/2009 | Ono | G06F 21/10 709/227 |
| 7,676,437 B2 * | 3/2010 | Satkunanathan | G06F 21/10 705/56 |

(Continued)

FOREIGN PATENT DOCUMENTS

| JP | 2003296276 | 10/2003 |
| JP | 4313425 | 8/2009 |
| JP | 2009277082 | 11/2009 |

*Primary Examiner* — Farid Homayounmehr
*Assistant Examiner* — Maung Lwin
(74) *Attorney, Agent, or Firm* — Brinks Gilson & Lione

(57) ABSTRACT

A smartphone into which an application is installed includes a first and second authentication processing unit. The first authentication processing unit is configured to determine whether or not a current activation time of the application is past expiration time; permits authentication if the current activation time is not past the expiration time; and denies authentication if the current activation time is past the expiration time. The second authentication processing unit is configured to determine whether or not the current activation time is after previous activation time; permit authentication if the current activation time is after the previous activation time; and deny authentication if the current activation time is not after the previous activation time, wherein second authentication processing allows authentication to be denied if the current activation time (tampered and unauthorized activation time) is time before the previous activation time, as a result of turning back an internal clock of the smartphone.

9 Claims, 11 Drawing Sheets

(56) References Cited

U.S. PATENT DOCUMENTS

| | | | | |
|---|---|---|---|---|
| 8,402,552 B2 * | 3/2013 | Goyal | | H04L 9/3271 |
| | | | | 726/27 |
| 9,210,170 B1 * | 12/2015 | Kim | | H04L 63/10 |
| 2002/0120579 A1 * | 8/2002 | Kawaguchi | | G06F 21/121 |
| | | | | 705/59 |
| 2005/0020285 A1 * | 1/2005 | Kozuki | | G06F 21/10 |
| | | | | 455/456.6 |
| 2005/0289072 A1 * | 12/2005 | Sabharwal | | G06F 21/121 |
| | | | | 705/59 |
| 2007/0143462 A1 * | 6/2007 | Venkatachalam | | G06F 21/554 |
| | | | | 709/223 |
| 2007/0192591 A1 * | 8/2007 | Yumoto | | G06F 21/32 |
| | | | | 713/159 |
| 2008/0178284 A1 * | 7/2008 | Harwell | | G06F 21/10 |
| | | | | 726/21 |
| 2008/0183712 A1 * | 7/2008 | Westerinen | | G06F 21/121 |
| 2009/0019541 A1 * | 1/2009 | Fontijn | | G06F 21/34 |
| | | | | 726/19 |
| 2009/0254482 A1 * | 10/2009 | Vadlamani | | G06F 21/10 |
| | | | | 705/59 |
| 2010/0299723 A1 * | 11/2010 | Holloway | | G06F 21/10 |
| | | | | 726/4 |
| 2013/0073872 A1 | 3/2013 | Kuno et al. | | |

* cited by examiner

EXPIRATION TIME AUTHENTICATION SYSTEM, EXPIRATION TIME AUTHENTICATION DEVICE, AND EXPIRATION TIME AUTHENTICATION METHOD FOR APPLICATIONS

RELATED APPLICATIONS

The present application claims priority to Japanese Patent Application Serial Number 2014-087326, filed Apr. 21, 2014, the entirety of which is hereby incorporated by reference.

BACKGROUND OF THE INVENTION

1. Field of the Invention

The present invention relates to an expiration time authentication system, an expiration time authentication device, and an expiration time authentication method for applications and, in particular, is suitable for use in an expiration time authentication system that performs authentication of expiration time of an application downloaded and installed from a server into a terminal device.

2. Description of the Related Art

In recent years, mobile terminals called smartphones have become prevalent. Smartphones are a mobile terminal in which the function of a mobile phone and the function of a personal digital assistant (PDA) are merged together. A smartphones has not only the capability to perform a telephone call function but also has the capability to perform the function of executing various kinds of applications, at which a PDA is good at. In smartphones, by downloading and installing a desired application (hereinafter, referred to as a smartphone application) from a server on the Internet, it is possible for a user to execute the smartphone application anytime and anywhere at a time of the user's choosing.

Among smartphone applications, there are smartphone applications whose expiration time is set to define an available time period. When using a smartphone application whose expiration time is set, it is necessary to be subjected to authentication. In general, it is necessary to cause a server to store therein user information including an expiration time, and cause a smartphone to connect to the server every time a user uses a smartphone application or as frequently as, for example, once a day in order to be subjected to authentication. When a smartphone is not able to be subjected to authentication, it becomes difficult to use the smartphone application or an available function of the application may be restricted.

Further, in a system in which a smartphone connects to a server and is subjected to authentication, while it is possible to strictly manage the expiration time, there has been the following problem. Specifically, in a case where, owing to a communication error, communication line congestion, or the like, it is difficult for the smartphone to connect to the server, it is difficult to subject the smartphone to authentication even if the smartphone intends to be subject to authentication. In particular, in third-world countries whose infrastructures are less developed, it may frequently be difficult to subject a smartphone to authentication. In this case, there has been a problem that it becomes difficult to use an installed smartphone application.

As a method for solving this problem, it is conceivable that, after downloading and installing a smartphone application from a server onto a smartphone, authentication is performed, without the smartphone being required to access the server, using an authentication function of managing expiration time, the authentication function being held in the smartphone application itself. In the past, there have been proposed several systems in each of which authentication is performed on a client side in a case where it is difficult to be subjected to authentication in a server (see, for example, Japanese Unexamined Patent Application Publication No. 2003-296276, Japanese Patent No. 4313425, and Japanese Patent No. 5138460).

In a computer network system described in Japanese Unexamined Patent Application Publication No. 2003-296276, when a client computer attempts to access a server computer and perform client authentication but the server computer is in an inoperative state or it is difficult to access the server computer for authentication, the client computer performs the client authentication, based on a client user name and a password, received from the server computer for authentication and stored in a storage unit.

In addition, in a network system described in Japanese Patent No. 4313425, in a case where a communication error occurs in communication with an authentication server during authentication, if authentication result history information stored in a memory is read and it is determined that a successful authentication was sent back in response to transmitting an authentication request to the authentication server, processing is executed under the assumption that authentication processing succeeds.

In Japanese Unexamined Patent Application Publication No. 2003-296276 or Japanese Patent No. 4313425, described above, authentication of expiration time relating to the usage of an application is not performed. In contrast, in an information processing service execution system described in Japanese Patent No. 5138460, as a general rule, a user PC connects to a server and authentication of expiration time is performed in an online state. On the other hand, in a case of an offline state of not connecting to a network, authentication of expiration time is performed using a tamper-resistant device such as an IC card attached to the user PC.

Specifically, the tamper-resistant device stores therein offline authentication data including a number of authentications performed in the offline state and a final date of authentication performed in an online state, and user information including a presence or absence of dues payment and expiration time. In addition to this, the tamper-resistant device stores therein in advance, authentication condition data including the number of authentication processing that is to be performed in an offline state and an available time period for authentication from the final date of authentication in the online state. In addition, in a case where the tamper-resistant device is instructed to perform user authentication by the user PC, an application is permitted to be used in the user PC, if at least one of two following authentication conditions is satisfied: a condition in which the number of authentication processing in an offline state is less than or equal to the predetermined number in the offline state, and a day when being subjected to authentication falls within the available-for-authentication time period from the final date of authentication performed in an online state; and a condition in which the user information indicates that dues are paid, and a day when being subjected to authentication is before the expiration time.

In an authentication method for the expiration time, described in Japanese Patent No. 5138460, authentication in an offline state between the user PC and the tamper-resistant device is performed based on a clock embedded in the user PC. The same applies to a case where an authentication function for managing expiration time is performed, the function being held in an application installed in a terminal device such as a smartphone. This authentication is also performed based on a clock embedded in the terminal device. However, in these cases, there is a possibility that a user performs an operation such as turning back of the internal clock in the terminal device, thereby fraudulently passing the authentication of the expiration time.

SUMMARY OF THE INVENTION

Accordingly, it is an object of the present invention to enable a terminal device to determine unauthorized usage of an application by a user by properly performing authentication of expiration time relating to the usage of the application, even in a state in which it is difficult to connect the terminal device to a server.

According to one aspect, in a terminal device into which an application is downloaded and installed from a server, first authentication processing is performed in which it is determined whether or not a current activation time of the application is past expiration time. Permission for authentication is adopted in a case where the current activation time is not past the expiration time, and authentication is denied in a case where the current activation time is past the expiration time is performed.

Second authentication processing is performed in which it is determined whether or not the current activation time is after previous activation time. Permission for authentication is adopted in a case where the current activation time is after the previous activation time, and r authentication is denied in a case where the current activation time is not after the previous activation time is performed. In place of the previous activation time, previous usage termination time of the application may be used.

In another aspect, in a case where it is possible to connect the terminal device to the server when the application is activated in the terminal device, the terminal device connects to the server. Third authentication processing is performed based on the server in place of the first authentication processing, and the authentication time thereof is set as the current activation time of the application.

In implementations configured as above, using the first authentication processing performed in the terminal device, without connecting the terminal device to the server, it is possible to determine whether or not the expiration time of the application has passed. Since this first authentication processing is performed using the internal clock of the terminal device, there is a possibility that a user performs a fraudulent operation such as turning back the internal clock thereof, thereby tampering with the activation time as if the expiration time does not pass even in a case where actually the expiration time has passed. However, if the current activation time (tampered and unauthorized activation time) is time before previous activation time as a result of turning back the internal clock, rejection of authentication is adopted by the second authentication processing.

From this, even in a state where it is difficult to connect the terminal device to the server, it is possible to deter the unauthorized usage of the application due to the user by properly performing the authentication of the expiration time of the application, based on the first authentication processing and the second authentication processing. In a case of using the previous termination time in place of the previous activation time in the second authentication processing, if the user turns back the internal clock, there is increased a possibility that the current activation time (tampered and unauthorized activation time) is time before the previous termination time. Therefore, it is possible to further reduce a possibility that the authentication of the expiration time is fraudulently passed.

In addition, according to another aspect, in a case where it is possible to connect the terminal device to the server at the time of activation of the application, the third authentication processing based on the server, which utilizes the internal clock of the server, is performed in place of the first authentication processing and the authentication time thereof is regarded as the current activation time of the application. In addition, the correct activation time (=the authentication time of the server) is used as the previous activation time in the second authentication processing at the time of next activation of the application. Therefore, it is possible to further reduce a possibility that the authentication of the expiration time is fraudulently passed at the time of the next activation of the application.

DETAILED DESCRIPTION OF THE DRAWINGS

First Embodiment

Figure 1:
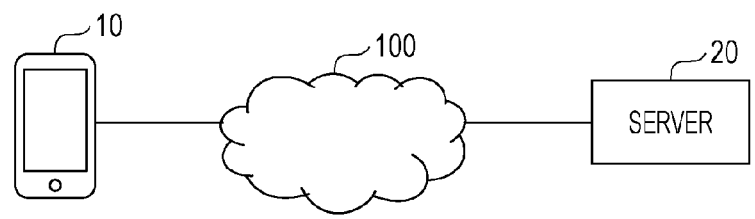
FIG. 1 is a diagram illustrating an example of a configuration of an expiration time authentication system for an application according to a first embodiment.

FIG. 1 is a diagram illustrating an example of the configuration of an expiration time authentication system for an application according to the first embodiment. As illustrated in FIG. 1, the expiration time authentication system for an application may include a smartphone 10 and a server 20, and is configured so that these are connectable through an Internet 100.

The smartphone 10 is able to download and install a desired smartphone application from the server 20 into an internal storage medium and execute the desired smartphone application. In the present embodiment, it is assumed that an expiration time for defining an available time period is set in the smartphone application to be installed into the smartphone 10. The expiration time is, for example, a time deadline for causing to be used for free of charge for a predetermined number of days after the installation or a time deadline for defining a time period of being available with a one-time charge.

In the first embodiment, authentication of the expiration time of the smartphone application downloaded and installed from the server 20 into the smartphone 10 is performed as the internal processing of the smartphone 10. In other words, this smartphone 10 configures an expiration time authentication device.

Note that, while the smartphone 10 is cited as an example of a terminal device, the same may apply to terminals able to install and execute a desired application and having an internal clock function. For example, a tablet terminal, a mobile phone, a personal computer, or the like may be used in place of the smartphone 10.

Figure 2:
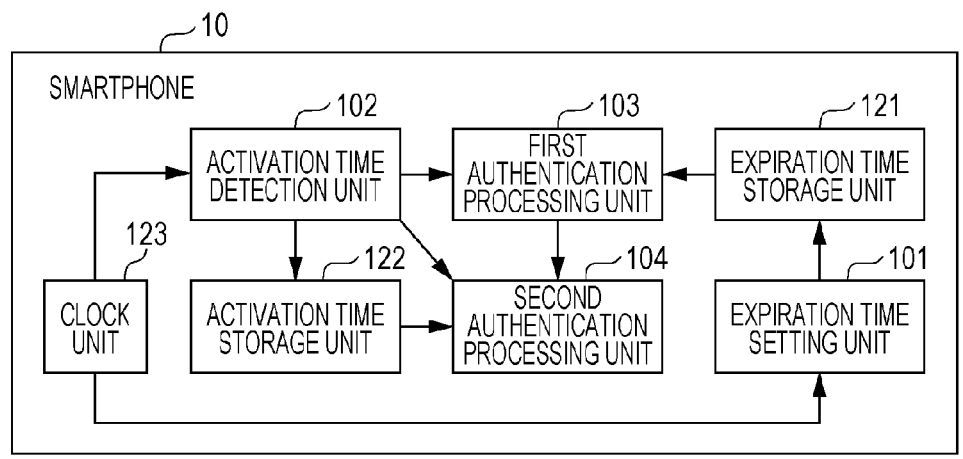
FIG. 2 is a block diagram illustrating an example of a configuration of a smartphone according to the first embodiment.

FIG. 2 is a block diagram illustrating an example configuration of the smartphone 10. Only main configurations relating to the first embodiment are illustrated. As illustrated in FIG. 2, the smartphone 10 includes an expiration time setting unit 101, an activation time detection unit 102, a first authentication processing unit 103, a second authentication processing unit 104, an expiration time storage unit 121, an activation time storage unit 122, and a clock unit 123.

The functional blocks of the expiration time setting unit 101, the activation time detection unit 102, the first authentication processing unit 103, and the second authentication processing unit 104 each include the CPU, the RAM, the ROM, and so forth of a computer. Additionally, each are realized by causing a program to operate, the program being stored in a recording medium such as the RAM, the ROM, a hard disk, or a semiconductor memory. This program is, for example, a program of the smartphone application downloaded and installed from the server 20 into the smartphone 10.

The expiration time setting unit 101 sets the expiration time of the smartphone application installed into the smartphone 10 and stores the expiration time in the expiration time storage unit 121. For example, in a case where it is embedded in the program of the smartphone application that the expiration time of the smartphone application is up to 30 days after installation, the expiration time setting unit 101 acquires, from the clock unit 123, a date and time of the installation of the smartphone application. The expiration time setting unit 101 sets, as the expiration time, a date and time 30 days after the former date and time, and stores the latter date and time in the expiration time storage unit 121.

The activation time detection unit 102 detects the activation time of the smartphone application installed into the smartphone 10. In other words, upon detecting activation of the smartphone application, the activation time detection unit 102 acquires the date and time of the activation, from the clock unit 123. The activation time detection unit 102 stores the detected activation time, in the activation time storage unit 122. The activation time storage unit 122 stores therein the activation time detected by the activation time detection unit 102 until at least a next activation time. In other words, when the activation time detection unit 102 stores the next activation time in the activation time storage unit 122, the previous activation time may be overwritten.

The first authentication processing unit 103 determines whether or not the current activation time detected by the activation time detection unit 102 is past the expiration time stored in the expiration time storage unit 121. In addition, in a case where the current activation time is not past the expiration time, permission for authentication is adopted. In addition to this, in a case where the current activation time is past the expiration time, rejection of authentication is adopted.

The second authentication processing unit 104 determines whether or not the current activation time detected by the activation time detection unit 102 is after the previous activation time stored in the activation time storage unit 122. In addition, in a case where the current activation time is after the previous activation time, permission for authentication is adopted. In addition, in a case where the current activation time is not after the previous activation time, rejection of authentication is adopted. In addition, it is only necessary for the second authentication processing unit 104 to be implemented in a case where the permission for authentication is adopted in the first authentication processing unit 103.

Figure 3:
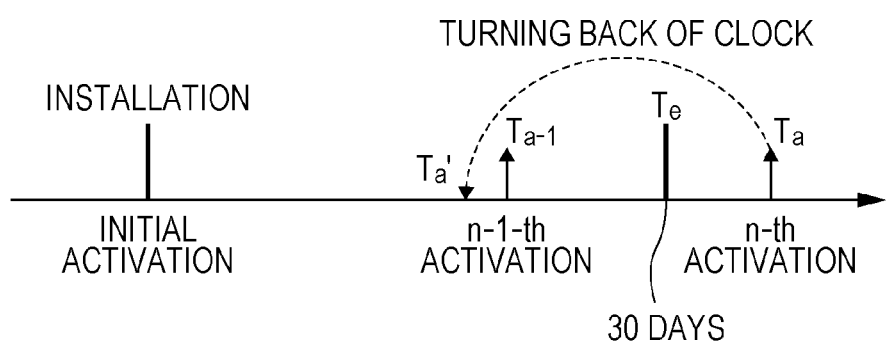
FIG. 3 is a diagram illustrating a content of authentication processing according to the first embodiment.

FIG. 3 is a diagram illustrating the content of authentication processing according to the first embodiment. In the example of FIG. 3, the date and time 30 days after a time point when the smartphone application is installed into the smartphone 10 is set as expiration time $T_e$. In addition, it is assumed that, after the smartphone application is activated for the first time immediately after installation, n−1-th activation is performed before the expiration time $T_e$ comes and n-th activation is performed after the expiration time $T_e$ goes.

In a case where the n-th activation is performed, the first authentication processing unit 103 determines whether or not n-th (current) activation time $T_a$ detected by the activation time detection unit 102 is past the expiration time $T_e$ stored in the expiration time storage unit 121. In the example of FIG. 3, the n-th activation time $T_a$ is past the expiration time $T_e$. Therefore, in this case, the first authentication processing unit 103 adopts the rejection of authentication. This is an operation in a normal state in which a user of the smartphone 10 does not perform an unauthorized operation such as turning back the time of the clock unit 123.

In contrast, it is assumed that, as illustrated by a dotted line arrow in FIG. 3, the user fraudulently operates the clock unit 123 in the smartphone 10, thereby turning back time. In this case, the first authentication processing unit 103 determines that n-th (current) activation time $T_a'$ detected by the activation time detection unit 102 is not past the expiration time $T_e$ stored in the expiration time storage unit 121, and turns out to adopt the permission for authentication.

On the other hand, the second authentication processing unit 104 determines whether or not the n-th activation time $T_a'$ (the fraudulently operated current time) detected by the activation time detection unit 102 is after n−1-th (previous) activation time $T_{a-1}$ stored in the activation time storage unit 122. In the example of FIG. 3, the n-th activation time $T_a'$ fraudulently turned back is before the n−1-th activation time $T_{a-1}$. Therefore, in this case, the second authentication processing unit 104 adopts the rejection of authentication.

In this way, according to the first embodiment, even in a state where normal authentication performed by the first authentication processing unit 103 is fraudulently passed by the operation of turning back the internal clock, it is possible to reject authentication, based on the authentication processing by the second authentication processing unit 104. From this, it is possible to prevent the unauthorized usage of the smartphone application past the expiration time $T_e$ in a normal situation.

In addition, in a case where the smartphone application is activated at a time (time fraudulently turned back) between the n−1-th activation time $T_{a-1}$ and the expiration time $T_e$, the second authentication processing is passed. However, since the unauthorized activation time $T_a'$ detected at that time is used, as previous activation time, for the second authentication processing at the time of next activation of the smartphone application, a state where it is more difficult to pass the second authentication processing at the time of the next activation occurs. In addition, since it becomes difficult to pass the second authentication processing someday, it is difficult for the user to continue to fraudulently use the smartphone application.

Figure 4:
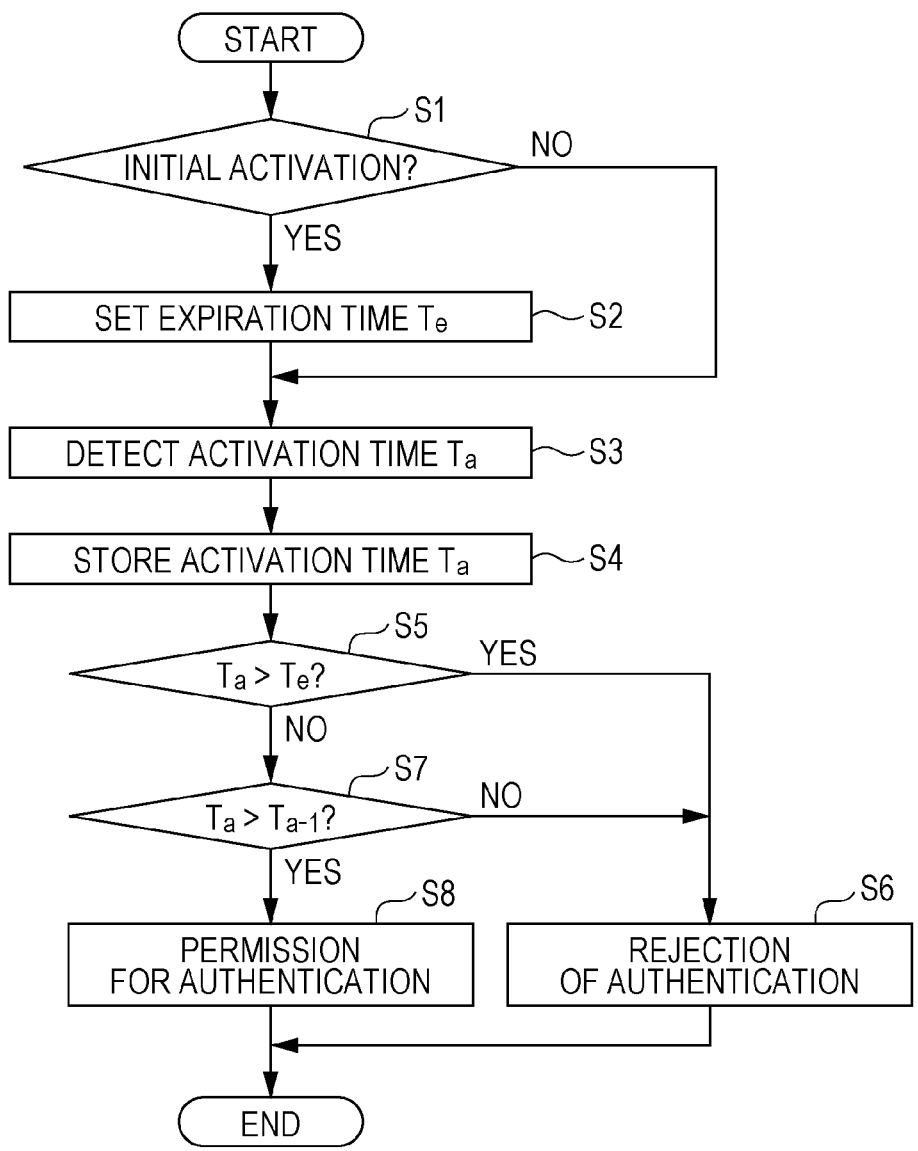
FIG. 4 is a flowchart illustrating an example of an operation of the smartphone according to the first embodiment.

FIG. 4 is a flowchart illustrating an example of the operation of the smartphone 10. The flowchart illustrated in FIG. 4 is started when, for example, the smartphone application is activated. In addition, here, it is assumed that, in a case where the smartphone application is installed into the smartphone 10, the smartphone application is automatically activated immediately thereafter, and an explanation will be made.

If the smartphone application is activated, first the expiration time setting unit 101 determines whether or not the activation is an initial activation (step S1). In a case of the initial activation, the expiration time setting unit 101 sets the expiration time $T_e$ of the smartphone application and stores the expiration time $T_e$ in the expiration time storage unit 121 (step S2). In addition, in a case where the activation of the smartphone application is not the initial activation, the processing operation in the step S2 is not performed.

Next, the activation time detection unit 102 detects the activation time $T_a$ of the smartphone application (step S3) and stores the detected activation time $T_a$ in the activation time storage unit 122 (step S4). In addition, the first authentication processing unit 103 determines whether or not the current activation time $T_a$ detected by the activation time detection unit 102 is past the expiration time $T_e$ stored in the expiration time storage unit 121 (step S5). Here, in a case where the current activation time $T_a$ is past the expiration time $T_e$, the first authentication processing unit 103 sets an authentication result to "rejection" (step S6). From this, the processing of the flowchart illustrated in FIG. 4 is terminated.

On the other hand, in a case where the current activation time $T_a$ is not past the expiration time $T_e$, the second authentication processing unit 104 determines whether or not the current activation time $T_a$ detected by the activation time detection unit 102 is after the previous activation time $T_{a-1}$ stored in the activation time storage unit 122 (step S7). Here, in a case where the current activation time $T_a$ is after the previous activation time $T_{a-1}$, the second authentication processing unit 104 sets an authentication result to "permission" (step S8). On the other hand, in a case where the current activation time $T_a$ is not after the previous activation time $T_{a-1}$, the second authentication processing unit 104 sets the authentication result to "rejection" (step S6). From this, the processing of the flowchart illustrated in FIG. 4 is terminated.

As described in detail above, in the first embodiment, in the smartphone 10 into which the smartphone application is downloaded and installed from the server 20, the first authentication processing is performed in which it is determined whether or not the current activation time of the smartphone application is past the expiration time, the permission for authentication is adopted in a case where the current activation time is not past the expiration time, and the rejection of authentication is adopted in a case where the current activation time is past the expiration time. In addition to this, the second authentication processing is performed in which it is determined whether or not the current activation time is after the previous activation time, the permission for authentication is adopted in a case where the current activation time is after the previous activation time, and the rejection of authentication is adopted in a case where the current activation time is not after the previous activation time.

When configured in such a manner, using the first authentication processing performed in the smartphone 10, without connecting the smartphone 10 to the server 20, it is possible to perform authentication based on whether or not the expiration time of the smartphone application has passed. Even in a state where the normal authentication performed by the first authentication processing unit 103 is fraudulently passed on the condition that the user performs an operation of turning back the internal clock of the smartphone 10, if the current activation time (tampered and unauthorized activation time) is time before the previous activation time, it is possible to adopt the rejection of authentication, based on the second authentication processing. From this, even in a state where it is difficult to connect the smartphone 10 to the server 20, it is possible to deter the unauthorized usage of the smartphone application due to the user by properly performing the authentication of the expiration time of the smartphone application, based on the first authentication processing and the second authentication processing.

Figure 5:
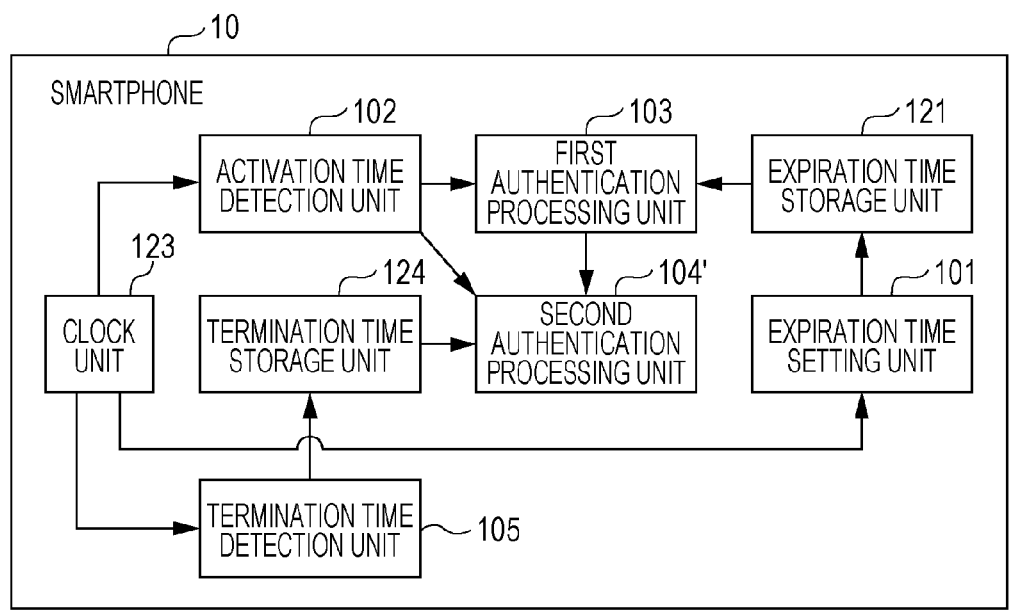
FIG. 5 is a diagram illustrating another example of the configuration of the smartphone according to the first embodiment.

FIG. 5 is a diagram illustrating another example of the configuration of the smartphone 10. In addition, in this FIG. 5, since a unit to which the same symbol as a symbol illustrated in FIG. 2 is assigned has the same function, the redundant description thereof will be omitted here. The smartphone 10 illustrated in FIG. 5 further includes a termination time detection unit 105. In addition, in place of the second authentication processing unit 104 and the activation time storage unit 122, a second authentication processing unit 104' and a termination time storage unit 124 are included.

The termination time detection unit 105 detects the usage termination time of the activated smartphone application (time when the smartphone application is shut down). In other words, upon detecting termination of the smartphone application, the termination time detection unit 105 acquires a date and time at that time, from the clock unit 123. The termination time detection unit 105 stores detected termination time in the termination time storage unit 124. The termination time storage unit 124 stores therein the termination time detected by the termination time detection unit 105 until at least next activation time.

The second authentication processing unit 104' determines whether or not the current activation time detected by the activation time detection unit 102 is after previous termination time stored in the termination time storage unit 124. In addition, in a case where the current activation time is after the previous termination time, permission for authentication is adopted. In addition to this, in a case where the current activation time is not after the previous termination time, rejection of authentication is adopted.

Figure 6:
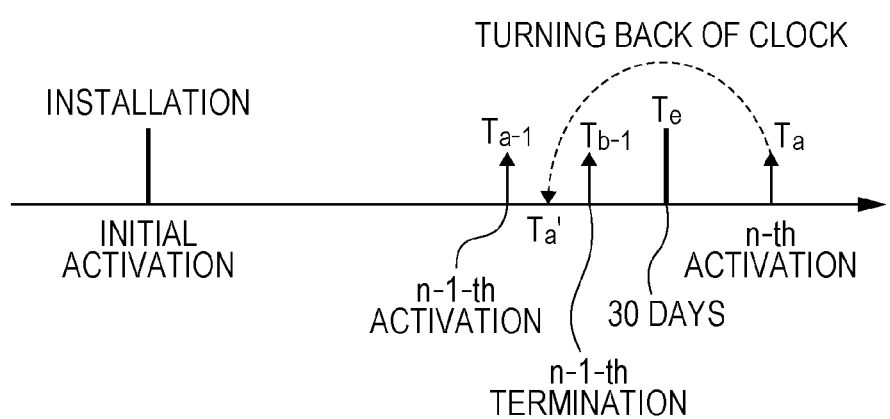
FIG. 6 is a diagram illustrating a content of authentication processing according to the smartphone illustrated in FIG. 5.

FIG. 6 is a diagram illustrating the content of authentication processing according to the smartphone 10 illustrated in FIG. 5. In the example of FIG. 6, in the same way as in FIG. 3, the date and time 30 days after a time point when the smartphone application is installed into the smartphone 10 is set as the expiration time $T_e$. In addition, it is assumed that n−1-th activation and n−1-th termination are performed for the smartphone application before the expiration time $T_e$ comes and n-th activation is performed after the expiration time $T_e$ goes.

In a case where the n-th activation is performed, the first authentication processing unit 103 determines whether or not n-th (current) activation time $T_a$ detected by the activation time detection unit 102 is past the expiration time $T_e$ stored in the expiration time storage unit 121. In the example of FIG. 6, the n-th activation time $T_a$ is past the expiration time $T_e$. Therefore, in this case, the first authentication processing unit 103 adopts the rejection of authentication. This is an operation in a normal state in which the user of the smartphone 10 does not perform an unauthorized operation such as turning back the time of the clock unit 123.

In contrast, it is assumed that, as illustrated by a dotted line arrow in FIG. 6, the user fraudulently operates the clock unit 123, thereby turning back time. In this case, the first authentication processing unit 103 determines that n-th (current) activation time $T_a'$ detected by the activation time detection unit 102 is not past the expiration time $T_e$ stored in the expiration time storage unit 121, and turns out to adopt the permission for authentication.

On the other hand, the second authentication processing unit 104' determines whether or not the n-th activation time $T_a'$ (fraudulently operated current time) detected by the activation time detection unit 102 is after n−1-th (previous) termination time $T_{b-1}$ stored in the termination time storage unit 124. In the example of FIG. 6, the n-th activation time $T_a'$ fraudulently turned back is before the n−1-th termination time $T_{b-1}$. Therefore, in this case, the second authentication processing unit 104' adopts the rejection of authentication.

In this way, in a case where, in the second authentication processing unit 104', the second authentication processing is performed using the previous termination time in place of the previous activation time, if the user turns back the internal clock, there is increased a possibility that the current activation time $T_a'$ (tampered and unauthorized activation time) is time before the previous termination time $T_{b-1}$. From this, it is possible to further reduce a possibility that the authentication of the expiration time is fraudulently passed by the user who turns back the internal clock.

Second Embodiment

Figure 7:
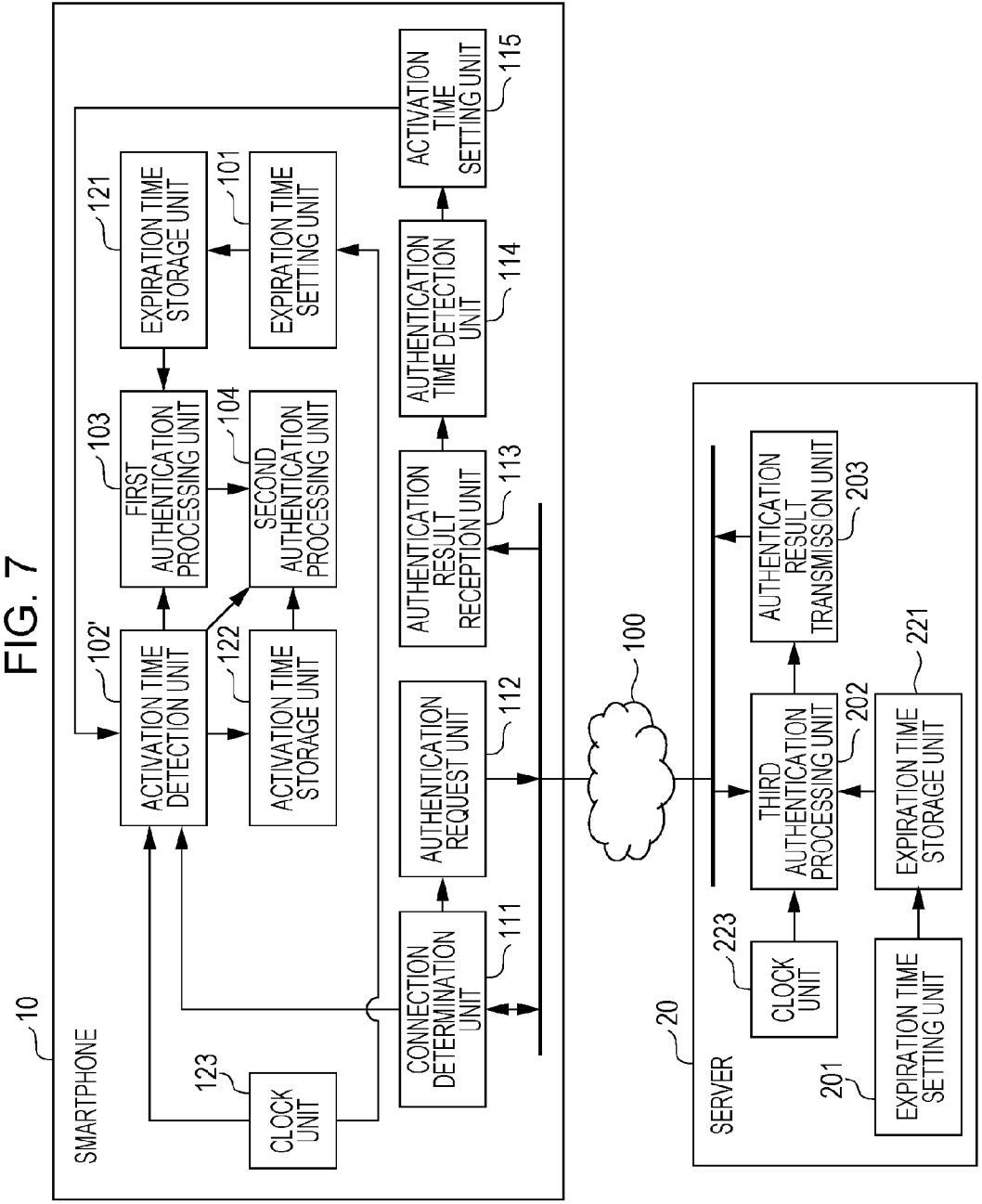
FIG. 7 is a block diagram illustrating examples of configurations of a smartphone and a server according to a second embodiment.

Next, a second embodiment of the present invention will be described. The entire configuration of an expiration time authentication system for an application according to the second embodiment is the same as in FIG. 1. FIG. 7 is a block diagram illustrating examples of the configurations of the smartphone 10 and the server 20 according to the second embodiment. In addition, in this FIG. 7, since a unit to which the same symbol as a symbol illustrated in FIG. 2 is assigned has the same function, the redundant description thereof will be omitted here.

As illustrated in FIG. 7, the smartphone 10 according to the second embodiment further includes a connection determination unit 111, an authentication request unit 112, an authentication result reception unit 113, an authentication time detection unit 114, and an activation time setting unit 115. In addition, the smartphone 10 according to the second embodiment includes an activation time detection unit 102' in place of the activation time detection unit 102. On the other hand, the server 20 according to the second embodiment includes an expiration time setting unit 201, a third authentication processing unit 202, an authentication result transmission unit 203, an expiration time storage unit 221, and a clock unit 223.

In a case where a smartphone application is activated in the smartphone 10, the connection determination unit 111 in the smartphone 10 determines whether it is possible to connect the smartphone 10 to the server 20. For example, a predetermined confirmation signal is transmitted from the smartphone 10 to the server 20, and after that, it is determined whether or not a response signal is fed back from the server 20 within a predetermined time period. In addition, in a case where a response is received within the predetermined time period, it is determined that it is possible to connect. In addition, in a case where a response is not received within the predetermined time period, it is determined that it is difficult to connect. The connection determination unit 111 notifies the activation time detection unit 102' and the authentication request unit 112 of the result of the determination.

In a case where the connection determination unit 111 determines that it is possible to connect, the authentication request unit 112 connects to the server 20 and makes a request for authentication. At this time, the authentication request unit 112 transmits the authentication request to the server 20 along with identification information capable of identifying the smartphone application. As an example of the identification information capable of identifying the smartphone application, the identification information of the smartphone 10 into which the smartphone application is installed or the user thereof or the identification information of the relevant smartphone application itself may be cited.

As the identification information of the smartphone 10, for example, a MAC address may be used. As the identification information of the user, by connecting to, for example, the server 20 at the time of installing the smartphone application, it is possible to use a user name, a user ID, or the like, registered in accordance with a user operation. In addition, as the identification information of the smartphone application itself, it is possible to use the serial number or the like of the smartphone application, issued on a server 20 side. These pieces of identification information are stored in a storage unit in the smartphone 10, not illustrated.

The authentication result reception unit 113 receives, from the server 20, authentication result information indicating a result of third authentication processing performed in the server 20 in response to the request based on the authentication request unit 112. In a case where the result of the third authentication processing, indicated by the authentication result information received from the server 20 by the authentication result reception unit 113, is permission for authentication, the authentication time detection unit 114 detects time when being authenticated in the server 20. This authentication time is acquired from the clock unit 223 when the server 20 performs the third authentication processing, and the authentication time is included in the authentication result information and transmitted. By confirming the authentication result information received in the authentication result reception unit 113, the authentication time detection unit 114 detects the authentication time.

The activation time setting unit 115 sets, as the current activation time of the smartphone application, the authentication time detected by the authentication time detection unit 114. In other words, the activation time setting unit 115 performs a setting so that the authentication time detected by the authentication time detection unit 114 is used as the current activation time of the smartphone application in place of the activation time detected by the activation time detection unit 102'. From this, even if the user operates the clock unit 123 in the smartphone 10, thereby turning back the internal clock, it is possible to regard the smartphone application as being activated not at unauthorized time but at correct time when authentication is performed in the server 20.

In a case where the connection determination unit 111 determines that it is difficult to connect the smartphone 10 to the server 20, the activation time detection unit 102' performs the same processing as that described in the first embodiment. In other words, the activation time detection unit 102' stores, in the activation time storage unit 122, the current activation time detected by itself. In addition, the first authentication processing unit 103 and the second authentication processing unit 104 perform the first authentication processing and the second authentication processing, respectively, using the activation time detected by the activation time detection unit 102'.

On the other hand, in a case where the connection determination unit 111 determines that it is possible to connect the smartphone 10 to the server 20, the activation time detection unit 102' stores, in the activation time storage unit 122, the activation time set by the activation time setting unit 115 (in other words, which is the authentication time detected by the internal clock in the server 20 and original and correct time when the smartphone application is activated in the smartphone 10), as the current activation time. In addition, using the activation time set by the activation time setting unit 115, the second authentication processing unit 104 performs the second authentication processing. In addition, the first authentication processing based on the first authentication processing unit 103 is not performed.

The expiration time setting unit 201 in the server 20 sets the expiration time of the smartphone application downloaded into the smartphone 10 and stores the expiration time in the expiration time storage unit 221. For example, when the smartphone application is activated immediately after being installed into the smartphone 10 and an authentication request is initially sent to the server 20, the expiration time setting unit 201 acquires a date and time at that time from the clock unit 223, sets, as the expiration time, a date and time 30 days after the former date and time, and stores the latter date and time in the expiration time storage unit 221.

Here, in a case where it is difficult to connect to the server 20 at the time of initial activation of the smartphone application (in other words, in a case where it is difficult to be subjected to the third authentication processing based on the server 20), the smartphone application is set so as to be difficult to use and a time point when being initially subjected to the third authentication processing is set as the starting point of reckoning of the expiration time. By doing so, it is possible to cause expiration time managed within the smartphone 10 and expiration time managed within the server 20 to coincide with each other.

At the time of storing the expiration time of the smartphone application in the expiration time storage unit 221, the expiration time setting unit 201 stores the expiration time while associating the expiration time with the above-mentioned identification information capable of identifying the smartphone application. In a case where the MAC address of the smartphone 10 is used as the relevant identification information, the MAC address is included in, for example, an authentication request the smartphone 10 initially transmits to the server 20 and the MAC address is acquired and stored in the expiration time storage unit 221 by the expiration time setting unit 201.

In a case where user information such as the user name or the user ID is used as the identification information capable of identifying the smartphone application, the input screen of the user information is displayed on, for example, the smartphone 10 at the time of initially activating the smartphone application, and the user information is input based on the user operation through the relevant input screen. In addition, the user information input through the input screen is included in the authentication request the smartphone 10 initially transmits to the server 20, and the user information is acquired and stored in the expiration time storage unit 221 by the expiration time setting unit 201.

In addition, in a case where the serial number of the smartphone application is used as the identification information capable of identifying the smartphone application, the serial number is given notice of at the time of, for example, initially downloading the smartphone application from the server 20 into the smartphone 10. In addition, the serial number is included in the authentication request the smartphone 10 initially transmits to the server 20, and the serial number is acquired and stored in the expiration time storage unit 221 by the expiration time setting unit 201.

In response to the authentication request sent from the authentication request unit 112 in the smartphone 10, the third authentication processing unit 202 determines whether or not the current time of the server 20, acquired from the clock unit 223, is past the expiration time of the smartphone application, stored in the expiration time storage unit 221. In addition, in a case where the current time is not past the expiration time, the permission for authentication is adopted. In addition to this, in a case where the current time is past the expiration time, the rejection of authentication is adopted. This third authentication processing based on the third authentication processing unit 202 is performed in place of the first authentication processing based on the first authentication processing unit 103 in the smartphone 10.

The authentication result transmission unit 203 transmits, to the smartphone 10, the authentication result information indicating the result of the third authentication processing performed by the third authentication processing unit 202. As described above, the authentication time acquired from the clock unit 223 is included in this authentication result information.

Figure 8:
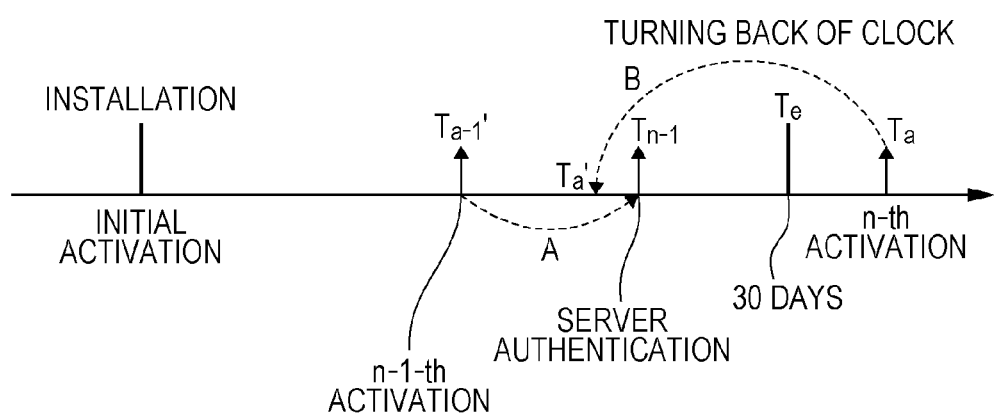
FIG. 8 is a diagram illustrating a content of authentication processing according to the second embodiment.

FIG. 8 is a diagram illustrating the content of authentication processing according to the second embodiment. In the example of FIG. 8, the date and time 30 days after a time point when the smartphone application is installed into the smartphone 10 is set as the expiration time $T_e$. In addition, it is assumed that, after the smartphone application is activated for the first time immediately after installation, the n−1-th activation is performed before the expiration time $T_e$ comes and the n-th activation is performed after the expiration time $T_e$ goes.

In addition, FIG. 8 illustrates an example where the smartphone 10 is subjected to the second authentication processing and the third authentication processing at the time of the n−1-th activation because it is possible for the smartphone 10 to connect to the server 20 and the smartphone 10 is subjected to the first authentication processing and the second authentication processing at the time of the n-th activation because it is difficult for the smartphone 10 to connect to the server 20. In addition, it is assumed that fraudulent turning back of the internal clock of the smartphone 10, due to the user, is performed at the time of the n−1-th activation and at the time of the n-th activation.

If it is possible for the smartphone 10 to connect to the server 20 when the n−1-th activation is performed, the authentication processing based on the third authentication processing unit 202 in the server 20 is performed in place of the first authentication processing unit 103 in the smartphone 10. In this case, the third authentication processing unit 202 determines whether or not the current time $T_{n-1}$ of the server 20, acquired from the clock unit 223, is past the expiration time $T_e$ of the smartphone application, stored in the expiration time storage unit 221. In the example of FIG. 8, since the current time $T_{n-1}$ is not past the expiration time $T_e$, an authentication is permitted. In this case, the current time $T_{n-1}$ of the server 20 is the authentication time.

In this case, the authentication result transmission unit 203 transmits, to the smartphone 10, the authentication result information (including the authentication time $T_{n-1}$) indicating the result of permission for authentication. In the smartphone 10, based on this authentication result information, the authentication time detection unit 114 detects the authentication time $T_{n-1}$. In addition, as illustrated by a dotted line arrow A, the activation time setting unit 115 sets, as the current activation time, the authentication time $T_{n-1}$ detected by the authentication time detection unit 114, in place of the activation time $T_{a-1}'$ (time fraudulently turned back) of the smartphone application, detected by the activation time detection unit 102'. Therefore, this authentication time $T_{b-1}$ is stored in the activation time storage unit 122 and used for the second authentication processing at the time of the n-th activation. In addition, while, at the time of the n−1-th activation, the second authentication processing in which the authentication time $T_{n-1}$ is used as the current activation time is performed, permission for authentication is adopted in the example of FIG. 8.

If, at the time of the n-th activation, it is difficult for the smartphone 10 to connect to the server 20, the first authentication processing unit 103 determines whether or not the n-th (current) activation time $T_a'$ (time fraudulently turned back as a dotted line arrow B) detected by the activation time detection unit 102' in the smartphone 10 is past the expiration time $T_e$ stored in the expiration time storage unit 121. In this case, since the n-th activation time $T_a'$ fraudulently turned back is not past the expiration time $T_e$, permission for authentication turns out to be adopted.

On the other hand, the second authentication processing unit 104 determines whether or not the n-th activation time $T_a'$ (fraudulently operated current time) detected by the activation time detection unit 102' is after the n−1-th (previous) activation time $T_{n-1}$ stored in the activation time storage unit 122. In the example of FIG. 8, the n-th activation time $T_a'$ fraudulently turned back is before the n−1-th activation time $T_{n-1}$. Therefore, in this case, the second authentication processing unit 104 adopts rejection of authentication.

Figure 9A:
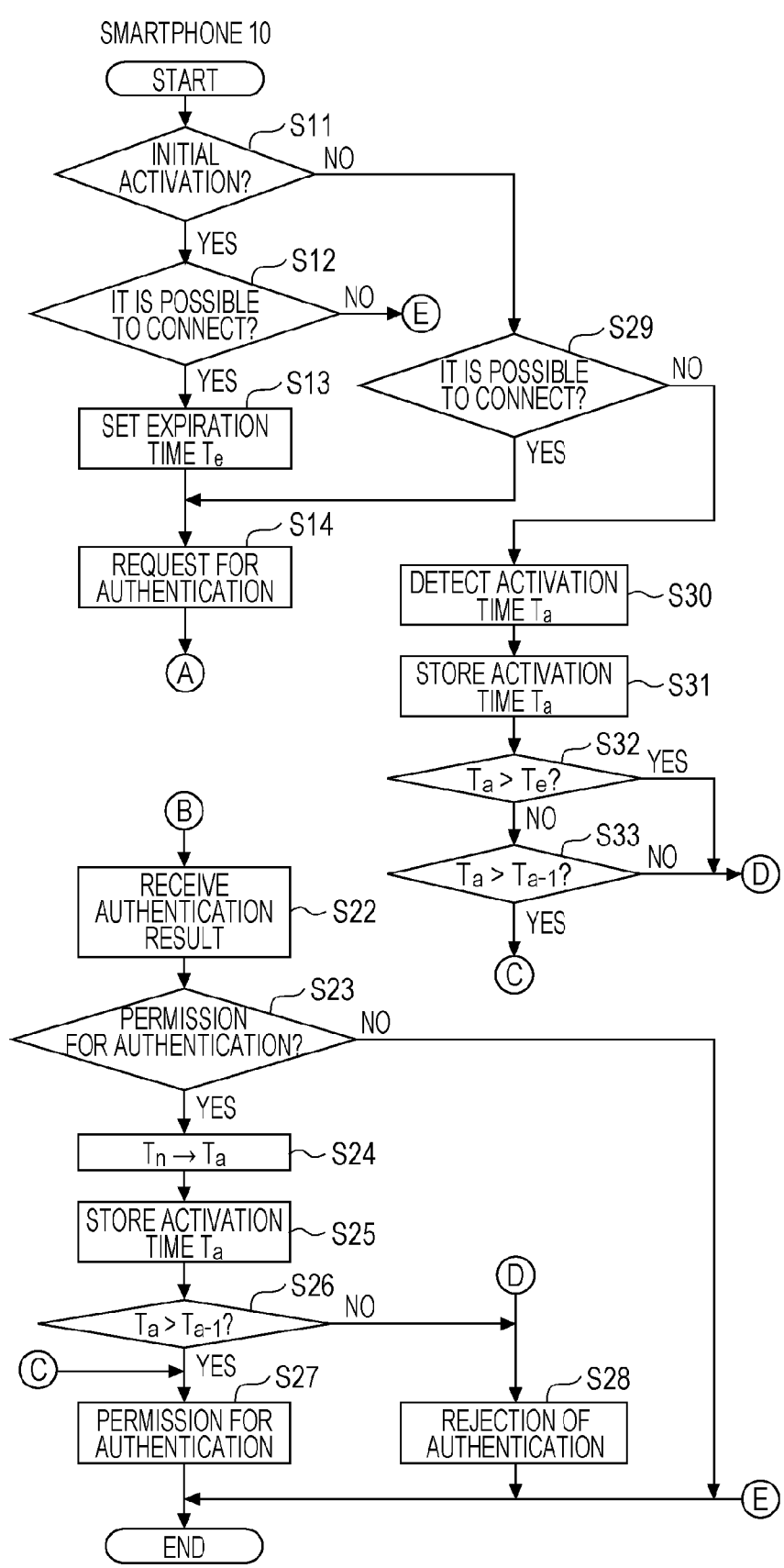
FIGS. 9A and 9B are flowcharts illustrating examples of operations of the smartphone and the server according to the second embodiment.
Figure 9B:
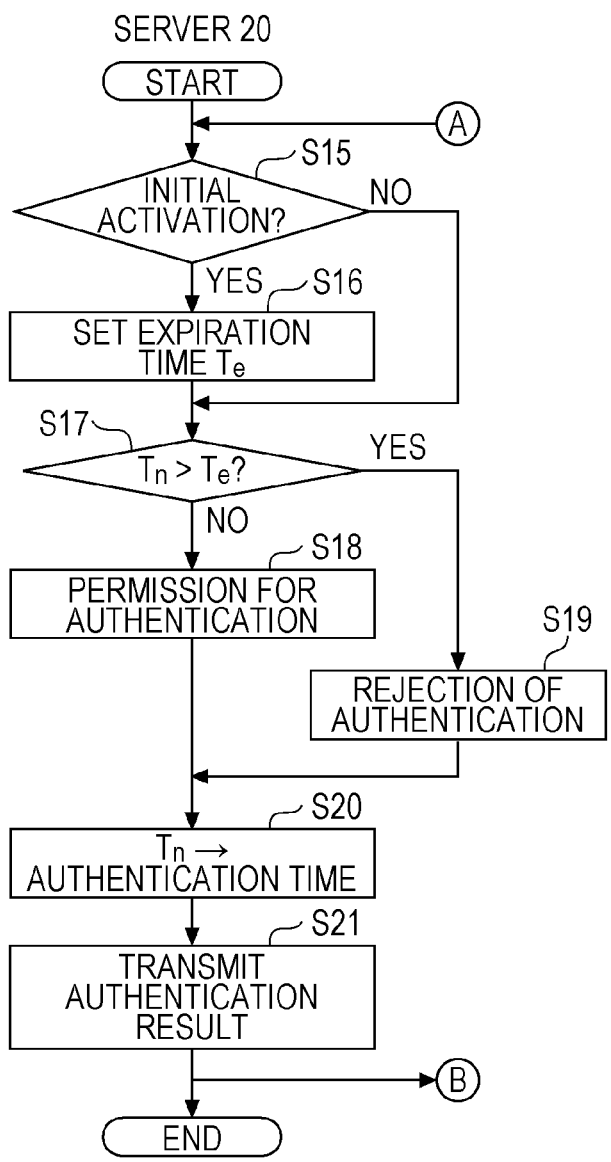

FIGS. 9A and 9B are flowcharts illustrating examples of the operations of the smartphone 10 and the server 20 according to the second embodiment. The flowcharts illustrated in FIGS. 9A and 9B are started when, for example, the smartphone application is activated. In addition, here, it is assumed that, in a case where the smartphone application is installed into the smartphone 10, the smartphone application is automatically activated immediately thereafter, and an explanation will be made.

If the smartphone application is activated in the smartphone 10, first the expiration time setting unit 101 determines whether or not the activation is initial activation (step S11). In a case of the initial activation, the connection determination unit 111 determines whether it is possible to connect the smartphone 10 to the server 20 (step S12). Here, in a case where it is determined that it is difficult to connect, the processing of the flowcharts illustrated in FIGS. 9A and 9B is terminated. On the other hand, in a case where it is determined that it is possible to connect, the expiration time setting unit 101 sets the expiration time $T_e$ of the smartphone application and stores the expiration time $T_e$ in the expiration time storage unit 121 (step S13).

After that, the authentication request unit 112 connects to the server 20 and makes a request for authentication (step S14). In the server 20 that receives the authentication request, the expiration time setting unit 201 determines whether or not the authentication request is an authentication request initially made by a smartphone application identified by the identification information included in the authentication request (step S15). In the server 20, by storing, for example, the number of times authentication processing based on the third authentication processing unit 202 is performed or flag information indicating whether or not the authentication request is an initial one while associating the number of times or the flag information with the identification information of the smartphone application, it is possible to determine whether or not the authentication request is an initial one.

In a case where it is determined that the authentication request is an initial one, the expiration time setting unit 201 sets the expiration time $T_e$ of the smartphone application and stores the expiration time $T_e$ in the expiration time storage unit 221 (step S16). In addition, in a case where the authentication request is not an initial one, the processing operation in the step S16 is not performed. Next, the third authentication processing unit 202 determines whether or not the current time $T_n$ of the server 20, acquired from the clock unit 223 in the server 20, is past the expiration time $T_e$ of the smartphone application, stored in the expiration time storage unit 221 (step S17).

Here, in a case where the current time $T_n$ of the server 20 is not past the expiration time $T_e$, the third authentication processing unit 202 sets an authentication result to "permission" (step S18). On the other hand, in a case where the current time $T_n$ of the server 20 is past the expiration time $T_e$, the third authentication processing unit 202 sets the authentication result to "rejection" (step S19). After that, the authentication result transmission unit 203 sets the current time $T_n$ as the authentication time (step S20) and transmits, to the smartphone 10, the authentication result information including the authentication time $T_n$ (step S21).

In the smartphone 10, the authentication result reception unit 113 receives the authentication result information transmitted by the authentication result transmission unit 203 (step S22). The authentication time detection unit 114 determines whether or not an authentication result indicated by the authentication result information is "permission" (step S23). Here, in a case where the authentication result is not "permission", the processing of the flowcharts illustrated in FIGS. 9A and 9B is terminated. In this case, the smartphone application is put into a state of being unusable.

On the other hand, in a case where the authentication result is "permission", the authentication time detection unit 114 detects the authentication time $T_n$ by confirming the authentication result information received in the authentication result reception unit 113. In addition, the activation time setting unit 115 sets the authentication time $T_n$ detected by the authentication time detection unit 114, as the current activation time $T_a$ of the smartphone application (step S24). In this case, the activation time detection unit 102' stores, in the activation time storage unit 122, the activation time $T_a$ of the smartphone application (=the authentication time $T_n$ of the server 20) set by the activation time setting unit 115 (step S25).

Next, the second authentication processing unit 104 determines whether or not the current activation time $T_a$ (=$T_n$) set by the activation time setting unit 115 is after the previous activation time $T_{a-1}$ stored in the activation time storage unit 122 (step S26). Here, in a case where the current activation time $T_a$ is after the previous activation time $T_{a-1}$, the second authentication processing unit 104 sets the authentication result to "permission" (step S27). On the other hand, in a case where the current activation time $T_a$ is not after the previous activation time $T_{a-1}$, the second authentication processing unit 104 sets the authentication result to "rejection" (step S28). From this, the processing of the flowcharts illustrated in FIGS. 9A and 9B is terminated.

In a case where, in the above-mentioned step S11, the expiration time setting unit 101 determines that the smartphone application is not subjected to initial activation, the connection determination unit 111 determines whether it is possible to connect the smartphone 10 to the server 20 (step S29). Here, in a case where it is determined that it is possible to connect, the processing proceeds to the step S14. On the other hand, in a case where it is determined that it is difficult to connect, the activation time detection unit 102' detects the activation time $T_a$ of the smartphone application (step S30) and stores the detected activation time $T_a$ in the activation time storage unit 122 (step S31).

In addition, the first authentication processing unit 103 determines whether or not the current activation time $T_a$ detected by the activation time detection unit 102' is past the expiration time $T_e$ stored in the expiration time storage unit 121. Here, in a case where the current activation time $T_a$ is past the expiration time $T_e$, the first authentication processing unit 103 sets an authentication result to "rejection" (step S28). From this, the processing of the flowcharts illustrated in FIGS. 9A and 9B is terminated.

On the other hand, in a case where the current activation time $T_a$ is not past the expiration time $T_e$, the second authentication processing unit 104 determines whether or not the current activation time $T_a$ detected by the activation time detection unit 102' is after the previous activation time $T_{a-1}$ stored in the activation time storage unit 122 (step S33). Here, in a case where the current activation time $T_a$ is after the previous activation time $T_{a-1}$, the second authentication processing unit 104 sets the authentication result to "permission" (step S27). On the other hand, in a case where the current activation time $T_a$ is not after the previous activation time $T_{a-1}$, the second authentication processing unit 104 sets the authentication result to "rejection" (step S28). From this, the processing of the flowcharts illustrated in FIGS. 9A and 9B is terminated.

As described in detail above, in the second embodiment, even in a state where normal authentication performed by the first authentication processing unit 103 is fraudulently passed by the operation of turning back the internal clock, it is possible to reject authentication, based on the authentication processing by the second authentication processing unit 104. Furthermore, according to the second embodiment, in a case where it is possible to connect the smartphone 10 to the server 20 at the time of activation of the smartphone application, the third authentication processing utilizing the internal clock of the server 20 is performed in place of the first authentication processing and the authentication time thereof is regarded as the current activation time of the smartphone application. In addition, the correct activation time (the authentication time of the server 20) is used as the previous activation time in the second authentication processing at the time of next activation of the smartphone application. Therefore, it is possible to further reduce a possibility that the authentication of the expiration time is fraudulently passed at the time of the next activation of the smartphone application.

In addition, while, in the above-mentioned second embodiment, an example is described in which authentication based on the third authentication processing unit 202 in the server 20 is performed in place of the first authentication processing unit 103 in the smartphone 10 in a case where the connection determination unit 11 determines that it is possible for the smartphone 10 to connect to the server 20, the present invention is not limited to this. In a case where, for example, it is determined that it is possible for the smartphone 10 to connect to the server 20, the authentication based on the third authentication processing unit 202 in the server 20 may be performed in place of the first authentication processing unit 102 and the second authentication processing unit 104 in the smartphone 10.

In addition, while, in the above-mentioned second embodiment, an example is described in which the activation time detection unit 102' stores the activation time $T_a$ (either activation time detected by the activation time detection unit 102' itself or the authentication time of the server 20 set by the activation time setting unit 115) in the activation time storage unit 122, the present invention is not limited to this. Only in a case where, for example, the activation time $T_a$ the activation time detection unit 102' intends to store is after the previous activation time $T_{a-1}$ already stored in the activation time storage unit 122, the current activation time $T_a$ may be stored.

In a case where, for example, in the example of FIG. 8, after the authentication time $T_{b-1}$ of the server 20 is stored, in the activation time storage unit 122, as the activation time $T_{a-1}$ of the smartphone application at the time of the n−1-th activation, it is difficult for the smartphone 10 to connect to the server 20 at the time of the n-th activation, the activation time $T_a$ stored in the activation time storage unit 122 by the activation time detection unit 102' at the time of the n-th activation is activation time detected in the activation time detection unit 102'. However, in a case where this activation time is the time $T_a'$ due to fraudulently turning back time, the current activation time $T_a'$ is before the previous activation time $T_{a-1}$ $(=T_{n-1})$ already stored in the activation time storage unit 122, as illustrated in FIG. 8. Therefore, in this case, the activation time detection unit 102' does not store the current activation time $T_a'$ in the activation time storage unit 122, and holds the activation time $T_{a-1}$ $(=T_{n-1})$ already stored in the activation time storage unit 122, without change.

Figure 10:
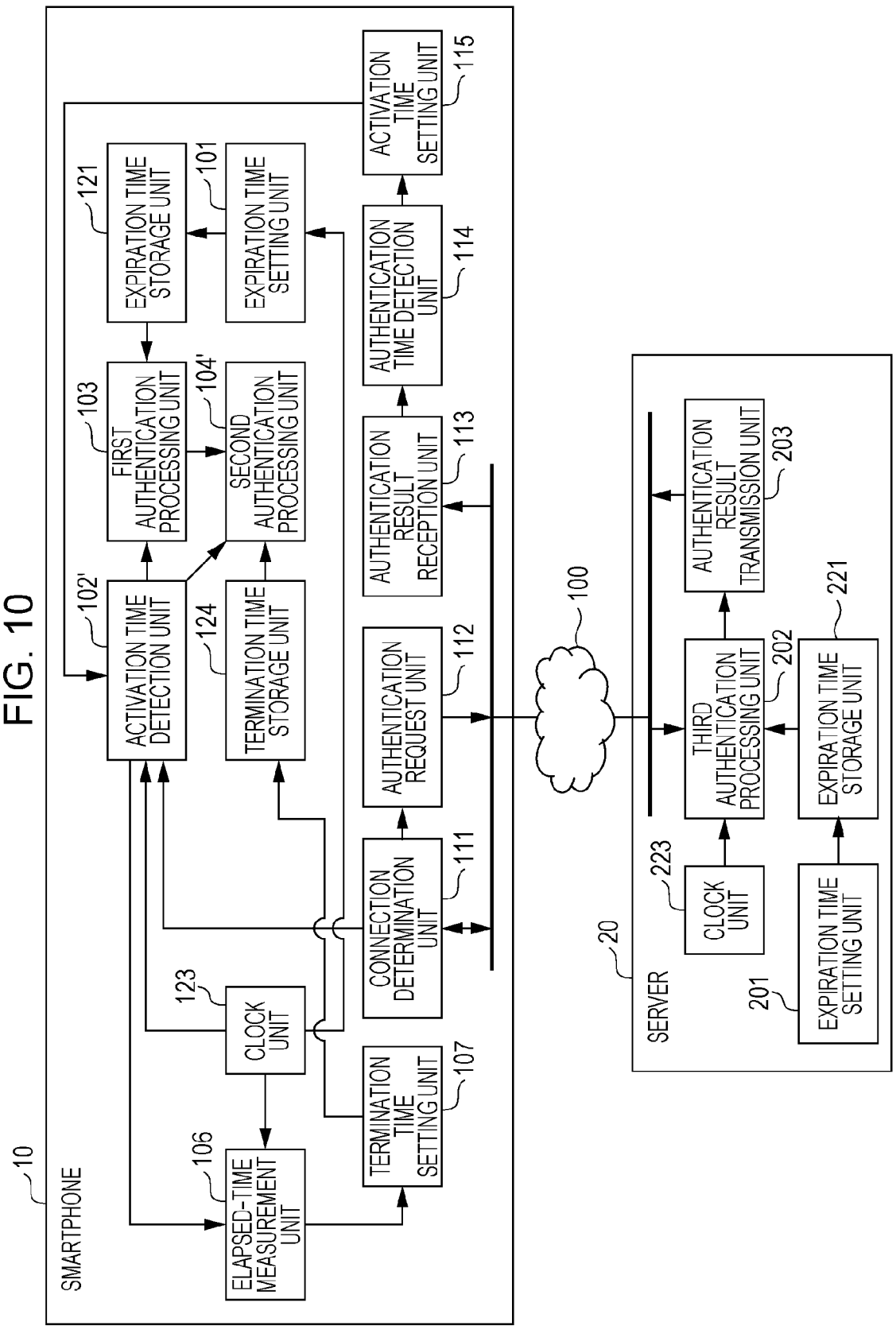
FIG. 10 is a diagram illustrating other examples of the configurations of the smartphone and the server according to the second embodiment.

FIG. 10 is a diagram illustrating another example of the configuration of the smartphone 10 according to the second embodiment. In addition, in this FIG. 10, since a unit to which the same symbol as a symbol illustrated in FIG. 7 is assigned has the same function, the redundant description thereof will be omitted here. The smartphone 10 illustrated in FIG. 10 further includes an elapsed-time measurement unit 106 and a termination time setting unit 107. In addition, in place of the second authentication processing unit 104 and the activation time storage unit 122 illustrated in FIG. 7, a second authentication processing unit 104' and a termination time storage unit 124 are included.

Using the clock unit 123, the elapsed-time measurement unit 106 measures elapsed time from the activation time of the smartphone application to termination (shutdown) of the smartphone application. Here, in a case where it is difficult for the smartphone 10 to connect to the server 20, the activation time is activation time detected by the activation time detection unit 102'. On the other hand, in a case where it is possible for the smartphone 10 to connect to the server 20, the activation time is authentication time acquired from the server 20 and set, as the current activation time, in the activation time detection unit 102' by the activation time setting unit 115.

The termination time setting unit 107 sets, as the usage termination time of the smartphone application, time obtained by adding the elapsed time, measured by the elapsed-time measurement unit 106, to the current activation time detected by the activation time detection unit 102' or the current activation time set by the activation time setting unit 115. In addition, the termination time setting unit 107 stores the set termination time in the termination time storage unit 124. The termination time storage unit 124 stores therein the termination time set by the termination time setting unit 107 until at least next activation time.

The second authentication processing unit 104' determines whether or not the current activation time detected by the activation time detection unit 102' or the current activation time set by the activation time setting unit 115 is after the pervious termination time stored in the termination time storage unit 124. In addition, in a case where the current activation time is after the previous termination time, permission for authentication is adopted. In addition to this, in a case where the current activation time is not after the previous termination time, rejection of authentication is adopted.

Figure 11:
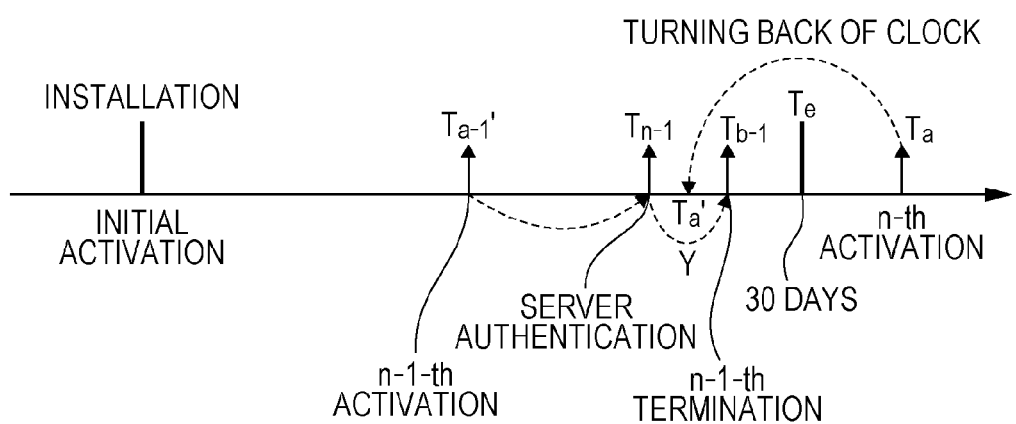
FIG. 11 is a diagram illustrating a content of authentication processing according to the smartphone illustrated in FIG. 10.

FIG. 11 is a diagram illustrating the content of authentication processing according to the smartphone 10 illustrated in FIG. 10. In the example of FIG. 11, in the same way as in FIG. 8, a date and time 30 days after a time point when the smartphone application is installed into the smartphone 10 is set as the expiration time $T_e$. In addition, it is assumed that, after the smartphone application is activated for the first time immediately after installation, n−1-th activation is performed before the expiration time $T_e$ comes and n-th activation is performed after the expiration time $T_e$ goes.

In addition, FIG. 11 illustrates an example where the smartphone 10 is subjected to the second authentication processing and the third authentication processing at the time of the n−1-th activation because it is possible for the smartphone 10 to connect to the server 20 and the smartphone 10 is subjected to the first authentication processing and the second authentication processing at the time of the n-th activation because it is difficult for the smartphone 10 to connect to the server 20. In addition, it is assumed that fraudulent turning back of the internal clock of the smartphone 10, due to the user, is performed at the time of the n−1-th activation and at the time of the n-th activation.

If it is possible for the smartphone 10 to connect to the server 20 when the n−1-th activation is performed, the authentication processing based on the third authentication processing unit 202 in the server 20 is performed in place of the first authentication processing unit 103 in the smartphone 10. In this case, the third authentication processing unit 202 determines whether or not the current time $T_{n-1}$ of the server 20, acquired from the clock unit 223, is past the expiration time $T_e$ of the smartphone application, stored in the expiration time storage unit 221. In the example of FIG. 11, since the current time $T_{n-1}$ is not past the expiration time $T_e$, an authentication result is permission.

In this case, the authentication result transmission unit 203 transmits, to the smartphone 10, the authentication result information (including the authentication time $T_{n-1}$) indicating the result of permission for authentication. In the smartphone 10, based on this authentication result information, the authentication time detection unit 114 detects the authentication time $T_{n-1}$. In addition, the activation time setting unit 115 sets, as the current activation time, the authentication time $T_{n-1}$ detected by the authentication time detection unit 114, in place of the activation time $T_{a-1}'$ (time fraudulently turned back) of the smartphone application, detected by the activation time detection unit 102'.

Here, the second authentication processing unit 104' determines whether or not the authentication time $T_{n-1}$, set as the current activation time, is after n−2-th (previous) termination time (not illustrated) stored in the termination time storage unit 124. In the example of FIG. 11, the current activation time (=the authentication time $T_{n-1}$) is determined to be after the previous termination time and permission for authentication is adopted.

Furthermore, elapsed time Y from this current activation time (=the authentication time $T_{n-1}$) to termination of the smartphone application is measured by the elapsed-time measurement unit 106, and time $T_{b-1}$ (=$T_{n-1}$+Y) obtained by adding this elapsed time Y to the authentication time $T_{n-1}$ is set as the termination time of the smartphone application by the termination time setting unit 107. Therefore, this termination time $T_{b-1}$ is stored in the termination time storage unit 124 and used for the second authentication processing at the time of the n-th activation.

If, at the time of the n-th activation, it is difficult for the smartphone 10 to connect to the server 20, the first authentication processing unit 103 determines whether or not the n-th (current) activation time $T_a'$ (time fraudulently turned back) detected by the activation time detection unit 102' in the smartphone 10 is past the expiration time $T_e$ stored in the expiration time storage unit 121. In this case, since the n-th activation time $T_a'$ fraudulently turned back is not past the expiration time $T_e$, permission for authentication turns out to be adopted.

On the other hand, the second authentication processing unit 104' determines whether or not the n-th activation time $T_a'$ (fraudulently operated current time) detected by the activation time detection unit 102' is after the n−1-th (previous) termination time $T_{b-1}$ (=$T_{n-1}$+Y) stored in the termination time storage unit 124. In the example of FIG. 11, the n-th activation time $T_a'$ fraudulently turned back is before the n−1-th termination time $T_{b-1}$. Therefore, in this case, the second authentication processing unit 104' adopts rejection of authentication.

In this way, in a case where, in the second authentication processing unit 104', the second authentication processing is performed using the previous termination time in place of the previous activation time, if the user turns back the internal clock, there is increased a possibility that the current activation time (tampered and unauthorized activation time) is time before the previous termination time. From this, it is possible to further reduce a possibility that the authentication of the expiration time is fraudulently passed by the user who turns back the internal clock.

In addition, in the example of FIG. 10, the termination time of the smartphone application is not detected using the clock unit 123 in the smartphone 10, and time obtained by adding the elapsed time, measured by the elapsed-time measurement unit 106, to the current activation time detected by the activation time detection unit 102' or the current activation time set by the activation time setting unit 115 is set as the usage termination time of the smartphone application. By doing so, in a case where the authentication time acquired by connecting to the server 20 is set as the current activation time, even if the clock unit 123 in the smartphone 10 is fraudulently turned back, it is possible to detect correct termination time, based on elapsed time measured while the smartphone application is used with beginning at original and correct activation time (=the authentication time) and it is possible to store the correct termination time in the termination time storage unit 124. From this, even if the activation time is tampered by turning back the internal clock in a case where the second authentication processing is performed at the time of next activation, a possibility that the activation time is time before the previous termination time is further increased, and it is possible to more reliably prevent the smartphone application from being fraudulently used.

In addition, while the termination time of the smartphone application is detected by the termination time detection unit 105 in the above-mentioned first embodiment, the elapsed time from the activation time, detected by the activation time detection unit 102, to the termination of the smartphone application may be measured and time obtained by adding the elapsed time to the current activation time may be set as the usage termination time of the smartphone application, in the same way as in the second embodiment.

In addition to this, it should be understood that the above-mentioned first and second embodiments each just illustrate an example of reduction to practice at the time of implementing the present invention and the technical scope of the present invention is not interpreted in a limited way by these. In other words, the present invention may be implemented in various forms without departing from the scope thereof or the main features thereof.

It is intended that the foregoing detailed description be regarded as illustrative rather than limiting, and that it be understood that it is the following claims, including all equivalents, that are intended to define the spirit and scope of this invention.

What is claimed is:

1. A terminal device of an expiration time authentication system for an application, which performs authentication of expiration time of the application downloaded and installed from a server to the terminal device, the terminal device comprising:
    an activation time detection unit configured to detect an activation time of the application,
    an activation time storage unit configured to store therein the activation time detected by the activation time detection unit until at least a next activation time,
    a first authentication processing unit configured to determine whether or not a current activation time detected by the activation time detection unit is past an expiration time until which the application is available, to permit authentication in a case where the current activation time is not past the expiration time, and to deny authentication in a case where the current activation time is past the expiration time, and
    a second authentication processing unit configured to determine whether or not the current activation time detected by the activation time detection unit is after a previous activation time stored in the activation time storage unit, to permit authentication in a case where the current activation time is after the previous activation time, and to deny authentication in a case where the current activation time is not after the previous activation time;
    a connection determination unit configured to determine whether it is possible to connect the terminal device to the server in a case where the application is activated in the terminal device,
    an authentication request unit configured to connect to the server and to request authentication in a case where the connection determination unit determines that it is possible to connect,
    an authentication time detection unit configured to detect an authentication time in a case where permission for authentication is adopted in the server in response to the request made by the authentication request unit, and
    an activation time setting unit configured to set the authentication time detected by the authentication time detection unit, as the current activation time of the application;
    wherein the server comprises a third authentication processing unit configured to determine whether or not a current time of the server is past the expiration time, in response to the request made by the authentication request unit, to permit authentication in a case where the current time of the server is not past the expiration time, and to deny authentication in a case where the current time of the server is past the expiration time, and
    wherein the expiration time authentication system performs authentication based on the third authentication processing unit in place of the first authentication processing unit in a case where the connection determination unit determines that it is possible to connect.

2. The terminal device of claim 1, wherein the terminal device further comprises:
    a termination time detection unit configured to detect a usage termination time of the activated application;
    a termination time storage unit configured to store therein the usage termination time detected by the termination time detection unit until at least a next activation time,
    wherein the second authentication processing unit is configured to determine whether or not the current activation time detected by the activation time detection unit is after a previous termination time stored in the termination time storage unit, to permit authentication in a case where the current activation time is after the previous usage termination time, and to deny authentication in a case where the current activation time is not after the previous usage termination time.

3. The terminal device of claim 2, wherein the terminal device further comprises:
    an elapsed-time measurement unit configured to measure an elapsed time from the activation time detected by the activation time detection unit to termination of the application, and
    a termination time setting unit configured to set, as the usage termination time of the application, time obtained by adding the elapsed time measured by the elapsed-time measurement unit to the activation time detected by the activation time detection unit.

4. The terminal device of claim 1, wherein the terminal device further comprises:
    an elapsed-time measurement unit configured to measure elapsed time from the activation time detected by the activation time detection unit or the activation time set by the activation time setting unit to termination of the application,
    a termination time setting unit configured to set, as usage termination time of the application, time obtained by adding the elapsed time measured by the elapsed-time measurement unit to the activation time detected by the activation time detection unit or the activation time set by the activation time setting unit, and
    a termination time storage unit configured to store therein the termination time set by the termination time setting unit until at least next activation time,
    wherein the second authentication processing unit is configured to determine whether or not the current activation time detected by the activation time detection unit or the current activation time set by the activation time setting unit is after a previous termination time stored in the termination time storage unit, to permit authentication in a case where the current activation time is after the previous termination time, and to deny authentication in a case where the current activation time is not after the previous termination time.

5. An expiration time authentication device for an application, which performs authentication of expiration time of the application downloaded and installed from a server to a terminal device, the expiration time authentication device comprising:

an activation time detection unit configured to detect activation time of the application;

an activation time storage unit configured to store therein the activation time detected by the activation time detection unit until at least next activation time;

a first authentication processing unit configured to determine whether or not a current activation time detected by the activation time detection unit is past an expiration time until which the application is available, to permit authentication in a case where the current activation time is not past the expiration time, and to deny authentication in a case where the current activation time is past the expiration time; and a second authentication processing unit configured to determine whether or not the current activation time detected by the activation time detection unit is after a previous activation time stored in the activation time storage unit, to permit authentication in a case where the current activation time is after the previous activation time, and to deny authentication in a case where the current activation time is not after the previous activation time;

a connection determination unit configured to determine whether it is possible to connect the terminal device to the server in a case where the application is activated in the terminal device;

an authentication request unit configured to connect to the server and to request authentication in a case where the connection determination unit determines that it is possible to connect;

an authentication time detection unit configured to detect an authentication time in a case where permission for authentication is adopted in the server in response to the request made by the authentication request unit; and an activation time setting unit configured to set the authentication time detected by the authentication time detection unit, as the current activation time of the application.

6. The expiration time authentication device for the application according to claim 5, further comprising:

a termination time detection unit configured to detect usage termination time of the activated application; and a termination time storage unit configured to store therein the termination time detected by the termination time detection unit until at least next activation time, wherein the second authentication processing unit is configured to determine whether or not the current activation time detected by the activation time detection unit is after a previous termination time stored in the termination time storage unit, to permit authentication in a case where the current activation time is after the previous termination time, and to deny authentication in a case where the current activation time is not after the previous termination time.

7. The expiration time authentication device for the application according to claim 6, further comprising:

an elapsed-time measurement unit configured to measure elapsed time from the activation time detected by the activation time detection unit to termination of the application, and a termination time setting unit configured to set, as the usage termination time of the application, time obtained by adding the elapsed time measured by the elapsed-time measurement unit to the activation time detected by the activation time detection unit.

8. The expiration time authentication device for the application according to claim 6, further comprising:

an elapsed-time measurement unit configured to measure elapsed time from the activation time detected by the activation time detection unit or the activation time set by the activation time setting unit to termination of the application;

a termination time setting unit configured to set, as usage termination time of the application, time obtained by adding the elapsed time measured by the elapsed-time measurement unit to the activation time detected by the activation time detection unit or the activation time set by the activation time setting unit; and a termination time storage unit configured to store therein the termination time set by the termination time setting unit until at least next activation time, wherein the second authentication processing unit is configured to determine whether or not the current activation time detected by the activation time detection unit or the current activation time set by the activation time setting unit is after a previous termination time stored in the termination time storage unit, to permit authentication in a case where the current activation time is after the previous termination time, and to deny authentication in a case where the current activation time is not after the previous termination time.

9. An expiration time authentication method for an application, used for performing authentication of expiration time of the application downloaded and installed from a server to a terminal device, the expiration time authentication method comprising:

a first step in which a hardware processor of terminal device utilizing an activation time detection unit to detect activation time of the application;

a second step in which the hardware processor of terminal device utilizing a connection determination unit to determine whether it is possible to connect the terminal device to the server in a case where the application is activated in the terminal device;

a third step in which, in a case where the connection determination unit determines that it is not possible to connect the terminal device to the server, the hardware processor of the terminal device utilizing a first authentication processing unit to determine whether or not a current activation time detected by the activation time detection unit is past an expiration time until which the application is available, to permit authentication in a case where the current activation time is not past the expiration time, and to deny authentication in a case where the current activation time is past the expiration time;

a fourth step in which, in a case where the connection determination unit determines that it is possible to connect the terminal device to the server, a hardware processor of the server utilizing a third authentication processing unit to determine whether or not a current time of the server is past the expiration time, in response to a request made by the authentication request unit, to permit authentication in a case where the current time of the server is not past the expiration time, and to deny authentication in a case where the current time of the server is past the expiration time;

a fifth step in which the hardware processor of the terminal device utilizing an authentication time detection unit to detect an authentication time in a case where the third authentication processing unit permits authentication;

a sixth step in which the hardware processor of the terminal device utilizing an activation time setting unit to set the authentication time detected by the authentication time detection unit, as the current activation time of the application;

a seventh step in which the hardware processor of the terminal device utilizing a second authentication processing unit to determine whether or not the current activation time detected by the activation time detection unit or the current activation time set by the activation time setting unit is after previous application termination time stored in a termination time storage unit, to permit authentication in a case where the current activation time is after the previous application termination time, and to deny authentication in a case where the current activation time is not after the previous application termination time;

an eighth step in which the hardware processor of the terminal device utilizing an elapsed-time measurement unit to measure elapsed time from the activation time detected by the activation time detection unit or the activation time set by the activation time setting unit to termination of the application; and a ninth step in which the hardware processor of the terminal device utilizing a termination time setting unit to set, as usage termination time of the application, time obtained by adding the elapsed time measured by the elapsed-time measurement unit to the activation time detected by the activation time detection unit or the activation time set by the activation time setting unit and stores the time in the termination time storage unit.

* * * * *